US008936417B2

(12) United States Patent
Tokawa et al.

(10) Patent No.: US 8,936,417 B2
(45) Date of Patent: Jan. 20, 2015

(54) METHOD OF CONTROLLING MACHINE TOOL AND MACHINE TOOL

(75) Inventors: Takahide Tokawa, Ritto (JP); Yoichi Togawa, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 896 days.

(21) Appl. No.: 13/133,310

(22) PCT Filed: Nov. 13, 2009

(86) PCT No.: PCT/JP2009/069337

§ 371 (c)(1), (2), (4) Date: Jun. 28, 2011

(87) PCT Pub. No.: WO2010/067690

PCT Pub. Date: Jun. 17, 2010

(65) Prior Publication Data

US 2011/0262239 A1 Oct. 27, 2011

(30) Foreign Application Priority Data

Dec. 8, 2008 (JP) ................................ 2008-311762

(51) Int. Cl.
*B23F 5/16* (2006.01)
*B23F 23/00* (2006.01)

(52) U.S. Cl.
CPC ................ *B23F 23/006* (2013.01); *B23F 5/16* (2013.01)
USPC ................................. 409/26; 409/33; 409/34

(58) Field of Classification Search
CPC ................ B23F 1/04; B23F 5/12; B23F 5/16
USPC ............................ 409/26, 31, 33–37, 58, 60
IPC ........................................................ B23F 5/16
See application file for complete search history.

(56) References Cited

U.S. PATENT DOCUMENTS 3,570,367 A * 3/1971 Looman et al. ................ 409/34
3,722,359 A * 3/1973 Hans et al. ...................... 409/34
6,065,910 A * 5/2000 Egawa et al. .................. 409/26

FOREIGN PATENT DOCUMENTS

JP 60085823 A * 5/1985
JP 62-94219 A 4/1987

(Continued)

OTHER PUBLICATIONS

Office Action dated Jan. 21, 2013 for Taiwan Application No. 098139154 with English translation.

*Primary Examiner* — Daniel Howell
(74) *Attorney, Agent, or Firm* — Birch, Stewart, Kolasch & Birch, LLP

(57) ABSTRACT

To provide a method of controlling a machine tool and a machine tool which allow preventing relieving interference without using a mechanism for causing an offset between a cutter (13) and a workpiece (50), a controller (40) performs control such that the workpiece (50) is machined by repeating the steps of: machining the workpiece (50) by moving the cutter (13) for machining the workpiece (50) in a direction parallel to a rotational axis of the cutter (50) while rotating the workpiece (50) together with the cutter (13); and returning the cutter (13) to a machining start position again after termination of the machining step, and performs offset control such that the cutter (13) is moved away from the workpiece (50) in a rotation direction of the cutter (13) upon the termination of the machining step.

6 Claims, 10 Drawing Sheets

I
50
13a
13
$C_1$
R
Rr
Rt
$C_2$
Rd

(56) References Cited

FOREIGN PATENT DOCUMENTS

| | | | | |
|---|---|---|---|---|
| JP | 10-109223 | A | | 4/1998 |
| JP | 2004-154921 | A | | 6/2004 |
| SU | 1641534 | A | * | 4/1991 |

* cited by examiner

13
Rd
$O_1$
$O_2$
50
(a)
(b)

METHOD OF CONTROLLING MACHINE TOOL AND MACHINE TOOL

TECHNICAL FIELD

The present invention relates to a method of controlling a machine tool and a machine tool.

BACKGROUND ART

A gear shaper is a machine tool including a cutter reciprocating mechanism in which a working tool (hereinafter called cutter) is reciprocated in a center axis direction of an object to be machined (hereinafter called a workpiece) so as to machine the workpiece in its advancing path and to be moved away from the workpiece in its returning path. Examples of such a gear shaper are disclosed in Patent Documents 1 and 2 below.

FIG. 7 is a schematic view showing how a workpiece is machined in a conventional gear shaper.

As shown in FIG. 7, for example, the gear shaper as disclosed in Patent Document 1 below performs gear cutting by shaping a workpiece 50 in such a manner that a cutter 13 attached to a main spindle 12 is given a rotational movement together with the workpiece 50 while being reciprocated vertically (arrow L1 in FIG. 7), the workpiece 50 being placed on a table (not shown) on which the workpiece 50 is attached for the machining.

The cutter 13 is in a vertical state near its rising end ([a] in FIG. 7). The cutter 13 is moved straight downward in this state and machines the workpiece 50 during the downward movement ([a] to [c] in FIG. 7). Near its falling end, the cutter 13 is moved away (relieved) R from the workpiece 50 in the arrow L2 direction by the amount of retraction (the amount of relieving) to become in a returning state ([d] in FIG. 7).

Next, the cutter 13 is moved upward in the state of [d]. Near its rising end, the cutter 13 approaches the workpiece 50 by the amount of relieving to become in the vertical state ([a] in FIG. 7). Then, the cutter 13 is moved downward again. By repeating these operations, the cutter 13 machines the workpiece 50 while being reciprocated vertically.

Here, the relieving direction of the cutter in relieving will be described.

FIG. 8 is a schematic view showing the relieving direction of the cutter in relieving.

As shown in FIG. 8, cutting blades 13*a* are formed in a side surface of the cutter 13. The tip of each cutting blade 13*a* is located on an addendum circle 13*b*, and the root of each cutting blade 13*a* is located on a dedendum circle 13*c*.

FIG. 9 is a schematic view showing how an internal gear is formed by the cutter.

As shown in FIG. 9, teeth 50*a* are formed in an inner surface of the workpiece 50 by the cutter 13. Here, a portion indicated by a broken line in the workpiece 50 is a portion 50*d* to be chipped.

As shown in FIG. 8, the tip of each formed tooth 50*a* is located on an addendum circle 50*b*, and the root of each tooth 50*a* is located on a dedendum circle 50*c*. In relieving R, the cutter 13 is relieved R in a direction connecting the center $O_2$ of the cutter 13 and the center $O_1$ of the workpiece 50. In other words, a direction from the center $O_2$ of the cutter 13 toward the center $O_1$ of the workpiece 50 is a relieving direction Rd.

However, in the conventional gear shaper described above, the cutter 13 and the workpiece 50 during machining sometimes interfere with each other (hereinafter called relieving interference) in the relieving R of the cutter 13, depending on the specifications of the workpiece to be machined into an internal gear, the specifications of the cutter, machining conditions, and the like.

Here, the relieving interference will be described.

FIG. 10 is a schematic view showing how the relieving interference occurs.

As shown in FIG. 10, the workpiece 50 during machining includes a portion 50*e* chipped this time and a portion 50*f* chipped in a previous rotation of the workpiece 50. For example, at a portion indicated by I in FIG. 10, the cutter 13 in the relieving R as shown by a dashed-two dotted line in FIG. 10 sometimes interferes with the portion 50*f* chipped in the previous rotation of the workpiece 50.

Note that, in FIG. 10, the relieving interference portion I is briefly illustrated for the sake of understanding; however, the relieving interference actually occurs at multiple positions in an extremely small area between the cutter 13 and the workpiece 50 in FIG. 10 due to machining conditions such as the amount of cut, a cutting speed, and a feed speed. Moreover, if a rotation direction C2 of the cutter 13 and a rotation direction C1 of the workpiece 50 during machining are as shown in the drawing, the interference does not occur in a lower half of the drawing but occurs in an upper half thereof.

PRIOR ART DOCUMENT

Patent Documents

Patent Document 1: JP-A Hei 10-109223
Patent Document 2: JP-A 2004-154921

SUMMARY OF THE INVENTION

Problems to be Solved by the Invention

In order to prevent the relieving interference, the relieving direction Rd shown in FIG. 10 needs to be changed to a direction of target relieving Rt with which the interference between the workpiece 50 and the cutter 13 shown in FIG. 10 can be prevented. Thus, a method of causing a static offset in a relative position between the cutter 13 and the workpiece 50 in a direction indicated by Y in FIG. 10 is known as a method of changing the relieving direction Rd to the direction of the target relieving Rt.

FIG. 11 is a schematic view showing a conventional method of changing the relieving direction Rd to the direction of the target relieving Rt.

As shown in Part (b) of FIG. 11, the center $O_2$ of the cutter 13 and the center $O_1$ of the workpiece 50 are shifted in the Y direction in FIG. 10 while the relieving direction Rd shown in Part (a) of FIG. 11 is kept as it is. This causes the virtual center line of the machine tool originally directed in the relieving direction Rd to be directed in an $O_2O_1$ vector, and thus causes the relieving direction Rd to incline relative to the virtual center line. Thereby, the relieving direction Rd can be changed to the direction of the target relieving Rt.

However, for the above conventional method of changing the relieving direction Rd to the direction of the target relieving Rt, it is necessary to add a mechanism capable of causing an offset between the cutter 13 and the workpiece 50 in the Y direction in FIG. 10 (see Patent Document 1, for example). This causes problems of complicating a machine configuration and increasing cost.

Thus, an object of the present invention is to provide a method of controlling a machine tool and a machine tool which allow preventing relieving interference without using a mechanism for causing an offset between a cutter and a workpiece.

Means for Solving the Problems

In a method of controlling a machine tool according to a first invention to solve the above problems, the machine tool is configured to machine a workpiece to be machined by repeating the steps of: machining the workpiece by moving a cutter for machining the workpiece in a direction parallel to a rotational axis of the cutter while rotating the workpiece together with the cutter; and returning the cutter to a machining start position again after termination of the machining step, the method characterized in that upon the termination of the machining step, offset control is performed such that the cutter is moved away from the workpiece in a rotation direction of the cutter without change in a relative position of the rotational axis of the cutter with respect to the workpiece.

A method of controlling a machine tool according to a second invention to solve the above problems is the method of controlling a machine tool according to the first invention, characterized in that upon the termination of the machining step, relieving is performed such that the cutter and the workpiece become away from each other by changing relative positions of the rotational axis of the cutter and a rotational axis of the workpiece with respect to each other, and, together with the relieving, the amount by which the cutter is moved away from the workpiece in the rotation direction thereof by the offset control is adjusted, thereby controlling a direction of target relieving.

A method of controlling a machine tool according to a third invention to solve the above problems is the method of controlling a machine tool according to the first invention, characterized in that upon the termination of the machining step, relieving is performed such that the cutter is moved away from the workpiece, the amount of the relieving is adjusted, and the amount by which the cutter is moved away from the workpiece in the rotation direction thereof by the offset control is adjusted, thereby controlling a direction and magnitude of target relieving.

A machine tool according to a fourth invention to solve the above problems is a machine tool comprising:

workpiece rotation means for rotating a workpiece to be machined;

cutter rotation means for rotating a cutter for machining the workpiece;

cutter reciprocation means for moving the cutter in a direction parallel to a rotational axis of the cutter;

relieving means for moving the cutter away from the workpiece; and control means for controlling the workpiece rotation means, the cutter rotation means, the cutter reciprocation means, and the relieving means, the machine tool characterized in that the control means performs control such that the workpiece is machined by repeating the steps of: machining the workpiece by moving the cutter for machining the workpiece in the direction parallel to the rotational axis of the cutter while rotating the workpiece together with the cutter; and returning the cutter to a machining start position again after termination of the machining step, and performs offset control such that the cutter is moved away from the workpiece in a rotation direction of the cutter upon the termination of the machining step.

A machine tool according to a fifth invention to solve the above problems is the machine tool according to the fourth invention, characterized in that the control means performs control such that relieving is performed in which the cutter is moved away from the workpiece upon the termination of the machining step, and adjusts the amount by which the cutter is moved away from the workpiece in the rotation direction thereof by the offset control together with the relieving, thereby controlling a direction of target relieving.

A machine tool according to a sixth invention to solve the above problems is the machine tool according to the fourth invention, characterized in that the control means performs control such that relieving is performed in which the cutter is moved away from the workpiece upon the termination of the machining step, and adjusts the amount of the relieving and the amount by which the cutter is moved away from the workpiece in the rotation direction thereof by the offset control, thereby controlling a direction and magnitude of target relieving.

Effects of the Invention

The present invention can provide a method of controlling a machine tool and a machine tool which allow preventing relieving interference without using a mechanism for causing an offset between a cutter and a workpiece.

MODES FOR CARRYING OUT THE INVENTION

Hereinbelow, a method of controlling a machine tool and a machine tool according to embodiments of the present invention will be described with reference to the drawings.

Embodiment 1

First of all, description will be given of a structure of a machine tool according to a first embodiment of the present invention.

Figure 4:
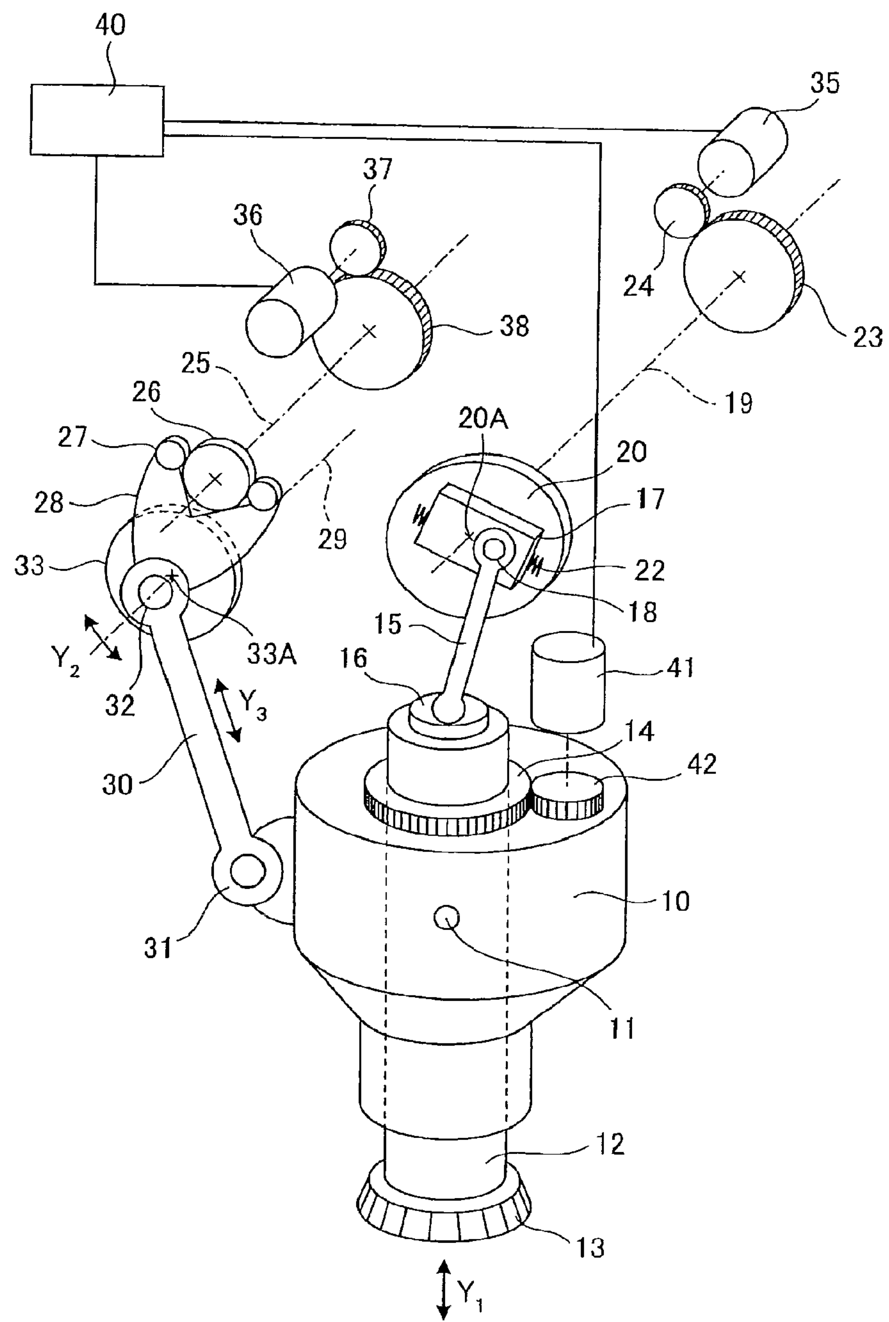
FIG. 4 is a schematic view showing principal portions of the machine tool according to the first embodiment of the present invention.
Figure 5:
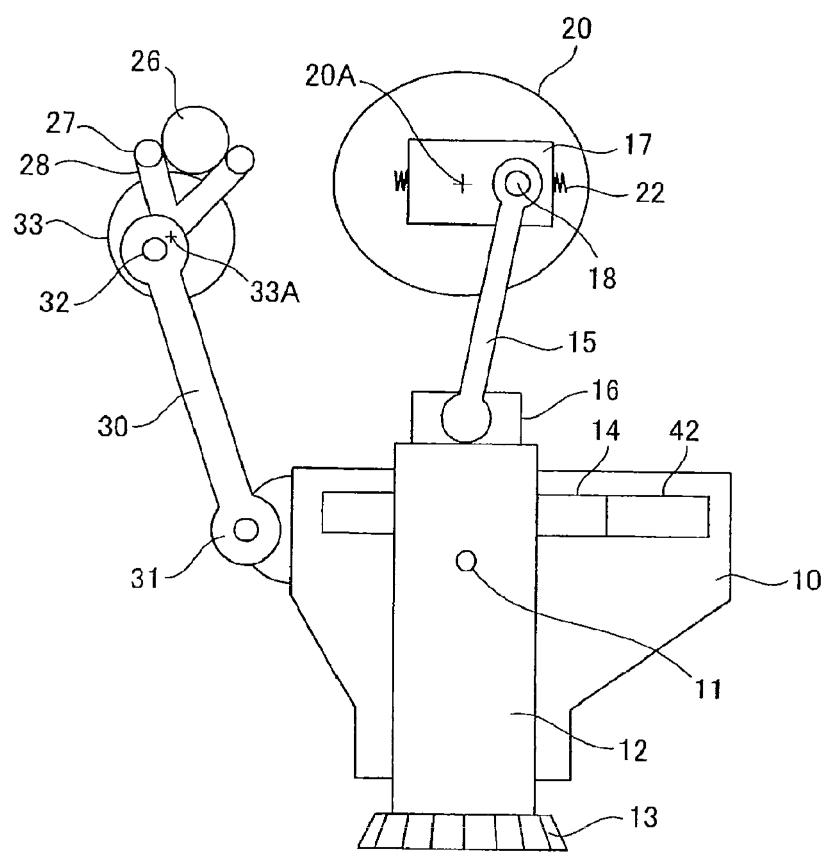
FIG. 5 is a cross-sectional view showing the principal portions of the machine tool according to the first embodiment of the present invention.

FIG. 4 is a schematic view showing principal portions of the machine tool according to the first embodiment of the present invention. FIG. 5 is a cross-sectional view showing the principal portions of the machine tool according to the first embodiment of the present invention.

As shown in FIGS. 4 and 5, in the machine tool according to this embodiment, a cutter head 10 is supported on a not-shown machine tool main body through a support 11 to be movable in a horizontal direction in FIGS. 4 and 5.

A main spindle 12 is placed in the cutter head 10 to extend in a vertical direction in FIGS. 4 and 5. A gear 14 is attached to the main spindle 12. The main spindle 12 has such a structure as to be slidable in the gear 14 in the vertical direction and to be rotated in its rotation direction together with the gear 14. The main spindle 12 is rotated with the rotation of the gear 14.

The gear 14 is driven by a main spindle driving motor 41 through a gear 42. It is preferable to use a servomotor as the main spindle driving motor 41. The use of the servomotor as the main spindle driving motor 41 allows control of a rotation angle of a cutter 13 with high speed and high accuracy. The cutter 13 is attached to a lower end portion of the main spindle 12, and is rotated in a C2 direction.

In a portion above the cutter head 10A, a crankshaft 19, a camshaft 25, and an eccentric shaft 29 are placed in the machine tool main body to be rotatable about their respective shaft centers. A crank faceplate portion 20 is attached to the crankshaft 19. The crank faceplate portion 20 is rotated about a center 20A of the crank faceplate portion 20 by the rotation of the crankshaft 19.

A sliding portion 17 is placed on the crank faceplate portion 20 to be movable on a surface of the crank faceplate portion 20 with a ball screw 22. An end portion of a crank arm 15 is attached to the sliding portion 17 through a pin 18. The crank arm 15 is swingable about the pin 18.

Further, the center 20A of the crank faceplate portion and the center of the pin 18 are attached to be eccentric to each other. The amount of eccentricity between the center 20A of the crank faceplate portion 20 and the center of the pin 18 can be adjusted by adjusting the ball screw 22 to move the sliding portion 17 on the crank faceplate portion. The amount of eccentricity between the center 20A of the crank faceplate portion and the center of the pin 18 is associated with the length of the vertical reciprocating movement of the main spindle 12, i.e., the larger the amount of eccentricity, the longer the length of the vertical reciprocating movement of the main spindle 12. The other end portion of the crank arm 15 is attached to an upper end portion of the main spindle 12 through a spherical bearing 16.

Further, a motor 35 for main spindle reciprocating movement is coupled to the crankshaft 19 through gears 23 and 24. It is preferable to use a servomotor as the motor 35 for main spindle reciprocating movement. The use of the servomotor as the motor 35 for main spindle reciprocating movement allows control of the crankshaft 19 with high speed and high accuracy.

A camshaft driving motor 36 is coupled to the camshaft 25 through gears 37 and 38. It is preferable to use a servomotor as the camshaft driving motor 36. The use of the servomotor as the camshaft driving motor 36 allows control of a rotation angle of the camshaft 25 with high speed and high accuracy, and also allows control of the camshaft driving motor 36 in synchronization with control of the motor 35 for main spindle reciprocating movement.

Further, a cam 26 is attached to the camshaft 25. The cam 26 is also rotated with the rotation of the camshaft 25. The cam 26 is constituted of two cams overlapping with each other or formed in one unit with their phases (angles) shifted from each other. These two cams are normal cams each having a shape in which the radius of the cam changes in a circumferential direction thereof. The shape of the cam 26 causes the amount, by which the cutter 13 moves backward from or moves forward to a workpiece, to be changed in accordance with the rotation angle of the camshaft 25.

An eccentric shaft faceplate portion 33 is attached to the eccentric shaft 29, and is rotatable in a Y2 direction about a center 33A of the eccentric shaft faceplate portion 33 in conjunction with the movement of the eccentric shaft 29. An end portion of a relieving rod 30 is attached to the eccentric shaft faceplate portion 33 through a pin 32 in such a way that the center 33A and the center of the pin 32 are eccentric to each other. The other end portion of the relieving rod 30 is attached to a left end portion of the cutter head 10 in the drawing through a pin 31 in such a way that the cutter head 10 is movable in the horizontal direction in FIGS. 4 and 5.

Further, a cam lever 28 is attached to the eccentric shaft faceplate portion 33 to be rotatable about the center 33A. Two cam followers 27 are attached to the cam lever 28. The two cam followers 27 are in contact with the cam 26 to interpose the cam 26 between them. One of the cam followers 27 is in contact only with the outer circumference of one of the two cams in the cam 26 having a shape constituted of these cams overlapping with each other or formed in one unit. Meanwhile, the other cam follower 27 is in contact only with the outer circumference of the other cam.

When the cam 26 is rotated, a distance between the center of the cam 26 and each cam follower 27 changes, so that the cam lever 28 is rotated about the center 33A in the Y2 direction. In conjunction with the rotation of the cam lever 28, the eccentric shaft 29 and the eccentric shaft faceplate portion 33 are rotated about the center 33A in the Y2 direction.

These are the structure of the machine tool according to the first embodiment of the present invention.

Next, description will be given of an operation of the machine tool according to the first embodiment of the present invention.

A controller 40 performs numerical control on the main spindle driving motor 41, the motor 35 for main spindle reciprocating movement, and the camshaft driving motor 36. The controller 40 issues a desired synchronous instruction, which is suited to a shape into which a workpiece 50 is to be machined, to the main spindle driving motor 41, the motor 35 for main spindle reciprocating movement, and the camshaft driving motor 36, and thereby performs synchronous control thereon with high speed and high accuracy.

When the motor 35 for main spindle reciprocating movement rotates in a direction, the crankshaft 19 coupled to the motor 35 for main spindle reciprocating movement is rotated in a direction. With the rotation of the crankshaft 19, the crank faceplate portion 20 and the sliding portion 17 are rotated about the crankshaft 19, so that the crank arm 15 is vertically reciprocated. In conjunction with the vertical movement of the crank arm 15, the cutter 13 is vertically reciprocated in a Y1 direction.

The length of the vertical reciprocating movement of the cutter 13 is determined by the amount of eccentricity between the center of the crankshaft 19 and the center of the pin 18. In the changing of the length of the vertical reciprocating movement of the main spindle 12, the ball screw 22 is adjusted to move the sliding portion 17 and to thereby adjust the amount of eccentricity between the center of the crankshaft 19 and the center of the pin 18, so that the length of the vertical reciprocating movement can be changed.

In response to the given synchronous instruction issued by the controller 40 and suited to the shape into which the workpiece 50 is to be machined, the camshaft driving motor 36 rotates in a desired direction in synchronization with the rotation of the motor 35 for main spindle reciprocating movement, and thereby rotates the camshaft 25 so that the rotation angle of the camshaft 25 may reach a desired angle. With the rotation of the camshaft driving motor 36, the camshaft 25 coupled to the camshaft driving motor 36 is rotated. In conjunction with the rotation of the camshaft 25, the cam lever 28 and the eccentric shaft faceplate portion 33 are rotated about the center 33A in the Y2 direction.

In conjunction with the rotational movement of the eccentric shaft faceplate portion 33, the relieving rod 30 is reciprocated in a Y3 direction. In conjunction with the reciprocating movement of the relieving rod 30, the cutter head 10 is moved in the horizontal direction in FIGS. 4 and 5. In conjunction with the movement of the cutter head 10 in the horizontal direction in FIGS. 4 and 5, the cutter 13 can move forward to or move backward from the workpiece 50. In this way, the machine tool according to this embodiment can be operated as desired by the controller 40.

These are the operation of the machine tool according to the first embodiment of the present invention.

Next, description will be given of the method of controlling the machine tool according to the first embodiment of the present invention in machining a workpiece.

Figure 6:
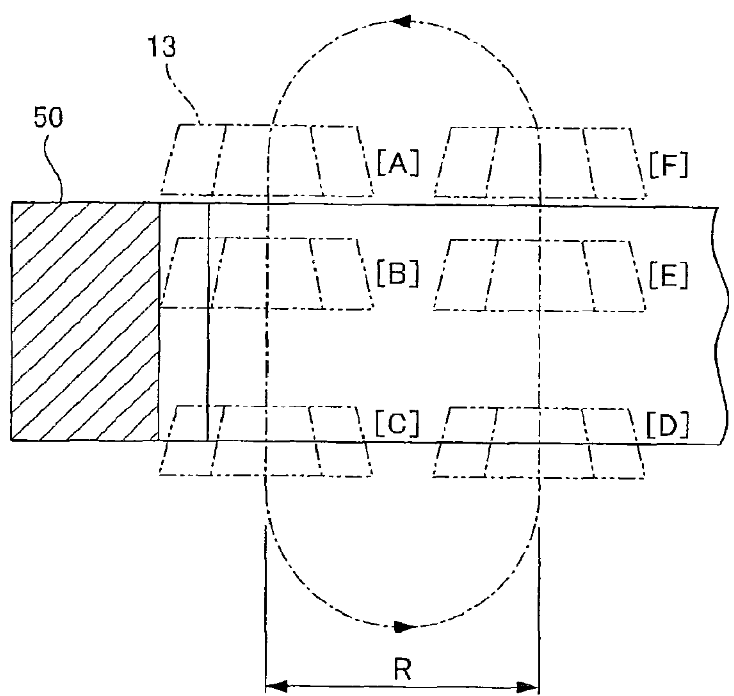
FIG. 6 is a schematic view showing a method of controlling the machine tool according to the first embodiment of the present invention in machining a workpiece.
Figure 7:
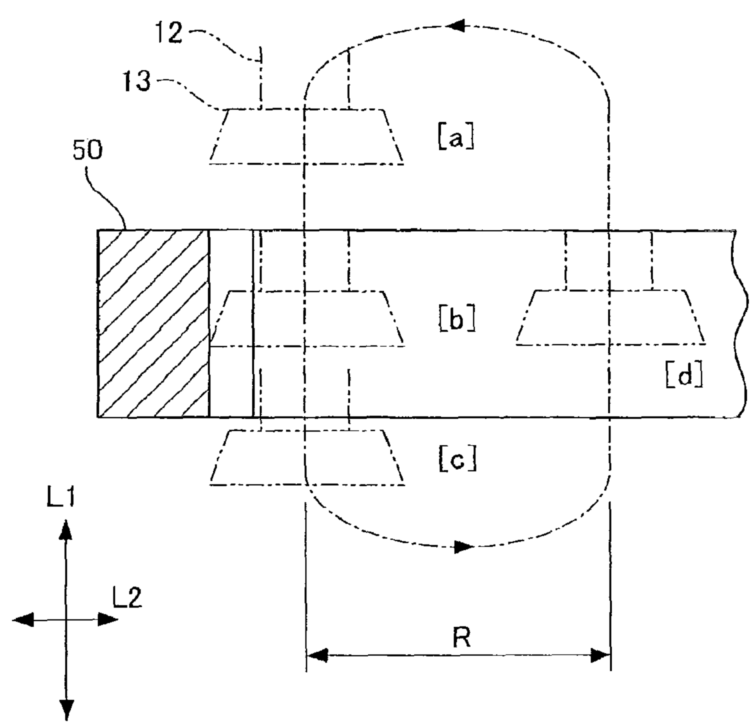
FIG. 7 is a schematic view showing how a workpiece is machined in a conventional gear shaper.
Figure 8:
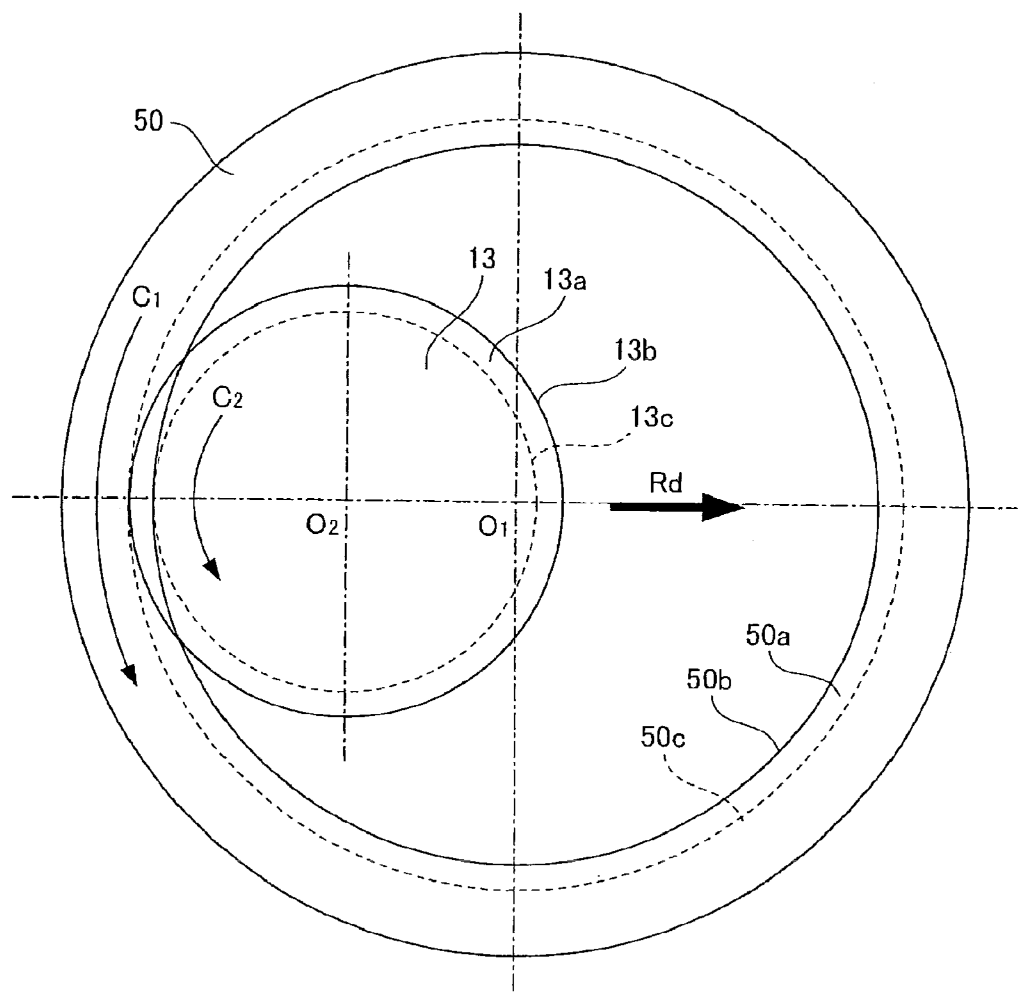
FIG. 8 is a schematic view showing a relieving direction of a cutter in relieving.
Figure 9:
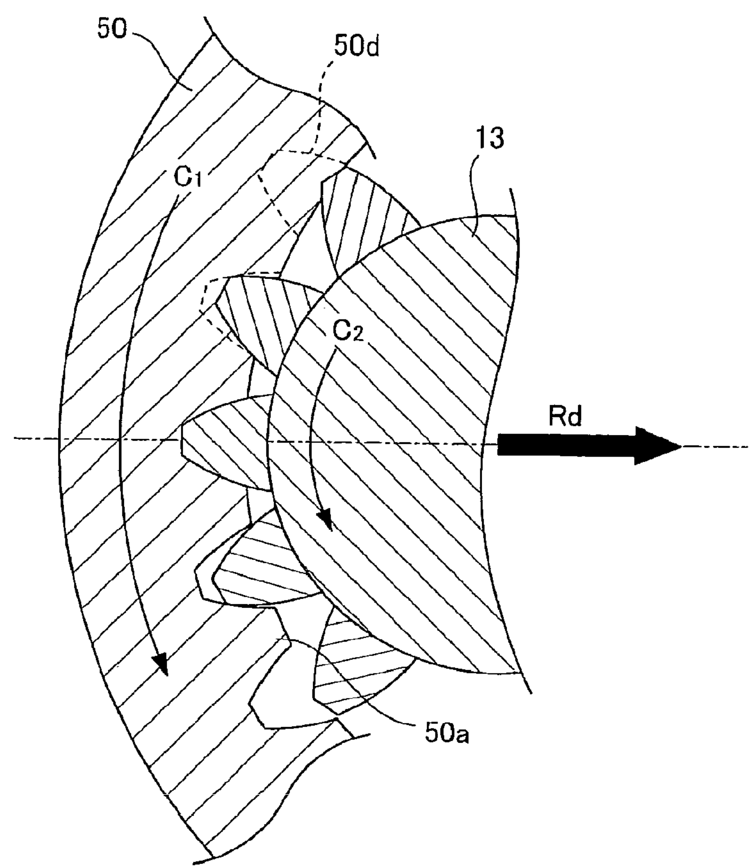
FIG. 9 is a schematic view showing how an internal gear is formed by the cutter.

FIG. 6 is a schematic view showing the method of controlling the machine tool according to the first embodiment of the present invention in machining a workpiece.

As shown in FIG. 6, the controller 40 performs control such that the cutter 13 may be moved in the order of [A]→[B]→[C] in a machining step, and moved in the order of [C]→[D]→[E]→[F]→[A] in a return step.

In the machining step, the cutter 13 starts the machining of the workpiece 50 at a position indicated by [A] in FIG. 6. A position indicated by [B] in FIG. 6 indicates a position of the cutter 13 during the machining of the workpiece 50. Then, the cutter 13 terminates the machining of the workpiece 50 at a position indicated by [C] in FIG. 6.

In the return step, the cutter 13 starts relieving R at the position indicated by [C] in FIG. 6. In other words, the cutter 13 starts the relieving R upon the termination of the machining of the workpiece 50.

According to this embodiment, the relieving interference is prevented by controlling the amount of rotation of the cutter 13 in the rotation direction C2, i.e., by performing control such that the cutter 13 may be moved away from the workpiece 50 in the rotation direction C2 (hereinafter referred to as offset control). Such control is performed by use of a specific phenomenon where, as shown in the relieving interference occurrence portion I (see FIG. 10), the relieving interference occurs in an extremely small area located in an upper half of the cutter 13 and the workpiece 50 in FIG. 10 but does not occur in a lower half thereof, in accordance with the rotation direction C2 of the cutter 13 and a rotation direction C1 of the workpiece 50 in machining.

Here, description will be given of a method of preventing relieving interference in the machine tool according to the first embodiment of the present invention.

Figure 1:
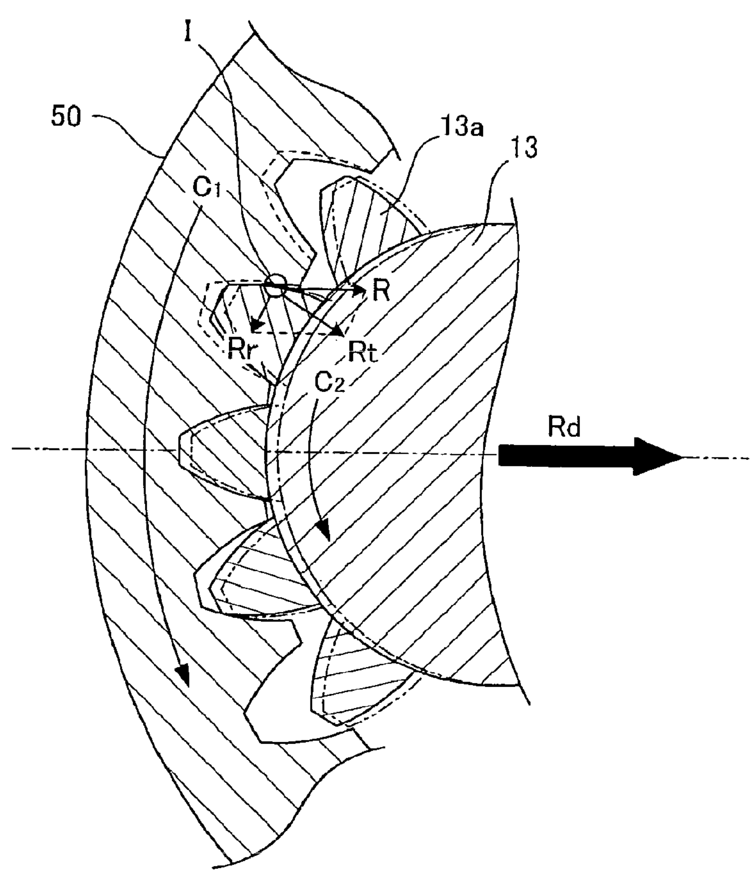
FIG. 1 is a schematic view showing a method of preventing relieving interference in a machine tool according to a first embodiment of the present invention.

FIG. 1 is a schematic view showing a method of preventing relieving interference in the machine tool according to the first embodiment of the present invention.

As shown in FIG. 1, the controller 40 performs, in synchronization with the relieving R, offset control such that relieving Rr in the rotation direction of the cutter 13 as shown in FIG. 1 may be performed in addition to the normal rotational movement of the cutter 13, and thereby substantially realizes target relieving Rt.

In other words, a machine tool capable of causing the controller 40 to perform numerical control on the rotation angle of the cutter 13, such as the machine tool according to this embodiment, can direct a direction of the target relieving Rt for a cutting blade 13*a* of the cutter 13 in the relieving interference portion I to a desired direction by performing offset control such that rotation by the amount corresponding to the relieving Rr in the rotation direction C2 of the cutter 13 may be additionally imposed on a position of the cutter 13 during the normal rotational movement in its rotation direction.

For example, suppose a case where the specifications of the workpiece are a module of 10, a pressure angle of 25°, the number of internal teeth of 46, a torsion direction of teeth being spur (straight cut gear), and a cut depth of 17.8 mm, where the specifications of the cutter are the number of blades of 15 and an outer diameter of 169.2 mm, and where machining conditions are a circumferential feed of 0.278 mm/stroke and a radial feed of 0.015 mm/stroke. In this case, in order to prevent the relieving interference in the relieving interference portion I as illustrated in FIG. 1, offset control is performed such that the cutter 13 may be moved away from the workpiece 50 in its rotation direction C2 by 0.3 mm (note that, this is a length on the circumference of a circle (PCD) connecting intermediate portions between the tips and the roots of the cutting blades 13*a* of the cutter 13 to each other, and is 0.23° when converted into the rotation angle).

Here, the stroke means one reciprocating movement of the cutter 13, and indicates a path that the cutter 13 travels once along top dead center→[A]→[B]→[C]→bottom dead center→[D]→[E]→[F]→top dead center in FIG. 6.

Note that, in FIG. 1, the relieving interference portion I is briefly illustrated for the sake of understanding; however, the relieving interference actually occurs at multiple positions in the extremely small area located in the upper half of the cutter 13 and the workpiece 50 in FIG. 1 in accordance with the rotation direction C2 of the cutter 13 and the rotation direction C1 of the workpiece 50 in machining. Hence, the amount by which rotation is to be additionally imposed by the offset control on one occurrence position can be different from that on another occurrence position.

Figure 2:
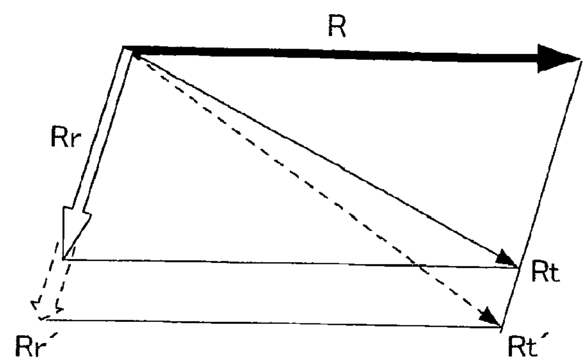
FIG. 2 is a schematic view showing a method of controlling a cutter in relieving according to the first embodiment of the present invention.

FIG. 2 is a schematic view showing a method of controlling the cutter in relieving according to the first embodiment of the present invention.

As shown in FIG. 2, even if the relieving R is of fixed length, the machine tool according to this embodiment is capable of controlling a direction of the target relieving Rt by adjusting the amount of relieving Rr in the rotation direction of the cutter 13 by the offset control.

In other words, even if the relieving R is of fixed length, control can be performed such that the target relieving Rt may be set to target relieving Rt' by setting the relieving Rr in the rotation direction of the cutter 13 to relieving Rr' in the rotation direction by the offset control.

These are the method of preventing the relieving interference in the machine tool according to the first embodiment of the present invention.

As shown in FIG. 6, the controller 40 terminates the relieving R at a position indicated by [D] in FIG. 6. The controller 40 controls the relieving Rr in the rotation direction of the cutter 13 at the positions indicated by [C] and [D] in FIG. 6. A position indicated by [E] in FIG. 6 indicates a position of the cutter 13 during returning. Note that, in FIG. 6, the amount of relieving is exaggeratingly shown for the sake of understanding.

The cutter 13 makes an approach to the workpiece 50 (i.e., which is opposite to the relieving) at a position indicated by [F] in FIG. 6. The controller 40 cancels the offset control at the positions indicated by [F] and [A] in FIG. 6 to return the position of the cutter 13 in the rotation direction C2 to the normal position thereof in the rotation movement. Then, the cutter 13 starts the machining of the workpiece 50 at the position indicated by [A] in FIG. 6.

These are the method of controlling the machine tool in the machining of the workpiece according to the first embodiment of the present invention.

Figure 10:
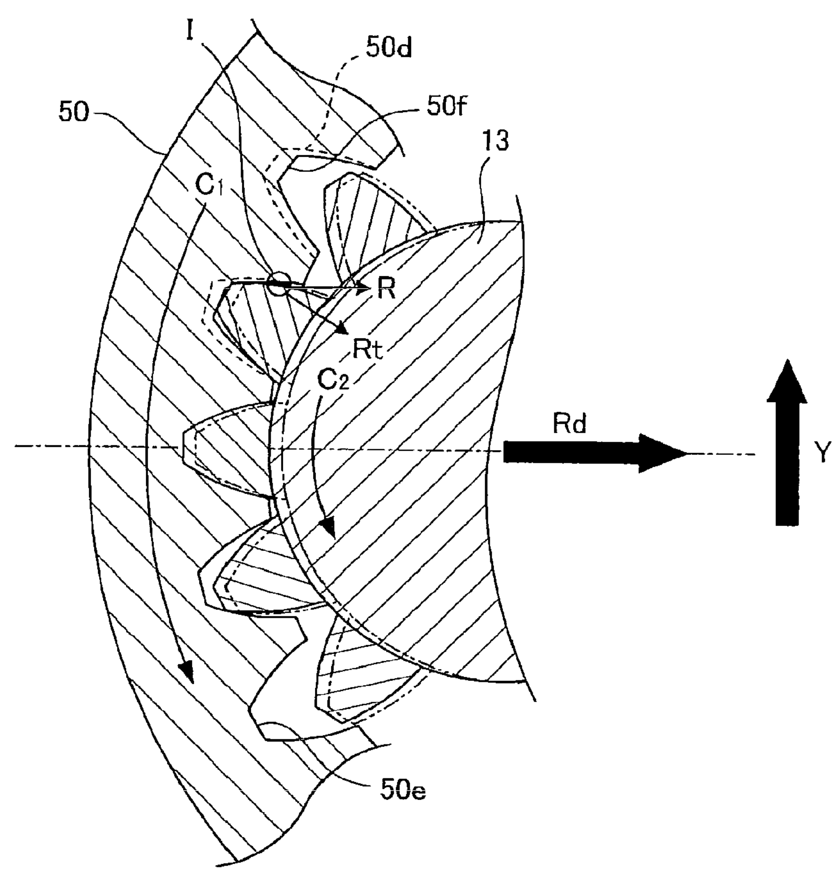
FIG. 10 is a schematic view showing how relieving interference occurs.
Figure 11:
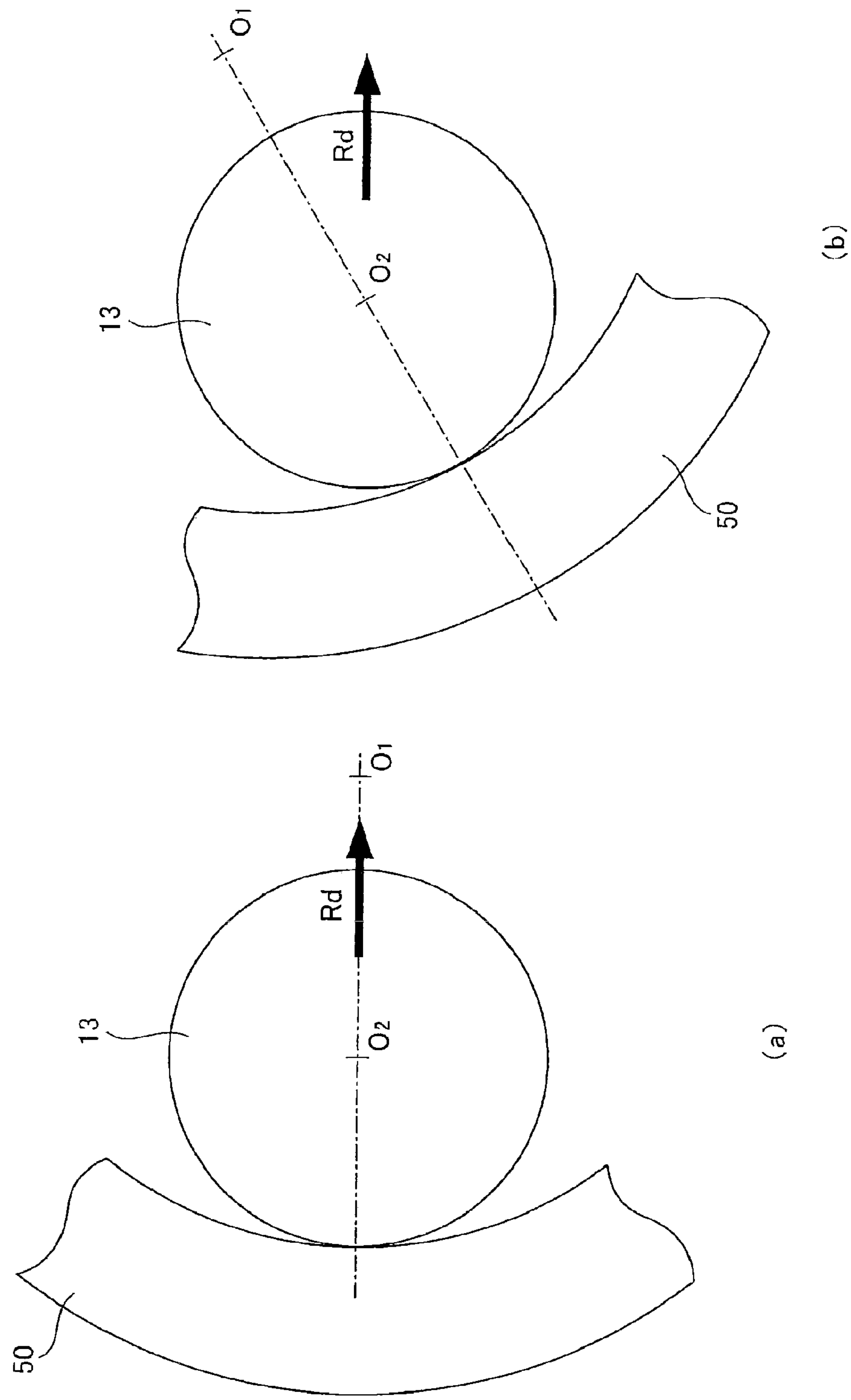
FIG. 11 is a schematic view showing a conventional method of changing a relieving direction Rd to a direction of target relieving Rt.

Thus, although the conventional gear shaper has to control the target relieving Rt by causing an offset between the cutter 13 and the workpiece 50 in the Y direction in FIG. 10, the machine tool according to this embodiment is capable of controlling the target relieving Rt for the cutting blade 13*a* of the cutter 13 in the relieving interference portion I only by the control of the rotation angle of the cutter 13.

Accordingly, a conventionally required mechanism to cause an offset between the cutter 13 and the workpiece 50 in the Y direction in FIG. 10 is no longer required. This simplifies a machine configuration and reduces cost.

Moreover, the method of preventing the relieving interference in the machine tool according to this embodiment can be implemented only by changing a program for the controller 40, which in turn reduces cost.

Embodiment 2

Hereinbelow, description will be given of a method of controlling a machine tool in relieving according to a second embodiment of the present invention. Note that, the configuration of the machine tool according to this embodiment is the same as that of the first embodiment.

Figure 3:
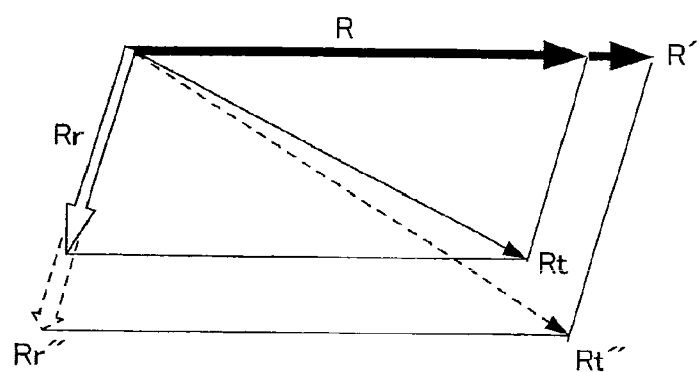
FIG. 3 is a schematic view showing a method of controlling a cutter in relieving according to a second embodiment of the present invention.

FIG. 3 is a schematic view showing the method of controlling a cutter in relieving according to the second embodiment of the present invention.

As shown in FIG. 3, a machine tool capable of performing numerical control on the rotation angle of the cutter 13 and the amount of relieving of the cutter 13 in a relieving direction Rd, such as the machine tool according to this embodiment, can control a direction and magnitude (i.e., vector) of the target relieving Rt by adjusting the amount of relieving R in the relieving direction Rd and the amount of relieving Rr in the rotation direction of the cutter 13 by the offset control.

In other words, control can be performed such that the target relieving Rt may be set to target relieving Rt" by setting the relieving R in the relieving direction Rd to relieving R' and setting the relieving Rr in the rotation direction of the cutter 13 by the offset control to the relieving Rr' in the rotation direction. Hence, an optimum vector of the target relieving Rt" can be achieved.

These are the method of controlling the machine tool in relieving according to the second embodiment of the present invention.

As has been described, with the method of controlling the machine tool according to the present invention, in the machine tool configured to machine the workpiece 50 to be machined by repeating the steps of: machining the workpiece 50 by moving the cutter 13 for machining the workpiece 50 in the vertical direction while rotating the workpiece 50 together with the cutter 13; and returning the cutter 13 to its machining start position again after termination of this machining step, offset control is performed such that the cutter 13 may be moved away from the workpiece 50 in its rotation direction upon the termination of the machining step. Thereby, the method is capable of controlling the target relieving Rt for the cutting blade 13*a* of the cutter 13 in the relieving interference portion I only by the control of the rotation angle of the cutter 13.

Accordingly, a conventionally required mechanism to cause an offset between the cutter 13 and the workpiece 50 in the Y direction in FIG. 10 is no longer required. This simplifies a machine configuration and reduces cost.

Moreover, the method of preventing the relieving interference in the machine tool according to this embodiment can be implemented only by changing a program for the controller 40, which in turn reduces cost.

Further, upon the termination of the machining step, the relieving R is performed such that the cutter 13 may be moved away from the workpiece 50, and the amount by which the cutter 13 is moved away from the workpiece 50 in its rotation direction by the offset control is adjusted together with the relieving R. Thereby, control can be performed such that the target relieving Rt may be set to the target relieving Rt' even if the relieving R is of fixed length.

Further, upon the termination of the machining step, the relieving R' is performed such that the cutter 13 may be moved away from the workpiece 50, and the amount by which the cutter 13 is moved away from the workpiece 50 in its rotation direction by the offset control is adjusted together with the adjusting of the amount of the relieving R'. Thereby, an optimum direction and magnitude of the target relieving Rt" can be achieved.

Furthermore, the machine tool according to the present invention includes workpiece rotation means for rotating the workpiece 50 to be machined; cutter rotation means for rotating the cutter 13 for machining the workpiece 50; cutter vertical movement means for moving the cutter 13 in the vertical direction; relieving means for moving the cutter 13 away from the workpiece 50; and the controller 40 for controlling the workpiece rotation means, the cutter rotation means, the cutter vertical movement means, and the relieving means. In the machine tool, the controller 40 performs control such that the workpiece 50 is machined by repeating the steps of: machining the workpiece 50 by moving the cutter 50 for machining the workpiece 50 in the vertical direction while rotating the workpiece 50 together with the cutter 13; and returning the cutter 13 to a machining start position again after termination of the machining step, and performs offset control such that the cutter 13 is moved away from the workpiece 50 in its rotation direction upon the termination of the machining step. Thereby, the machine tool is capable of controlling the target relieving Rt for the cutting blade 13*a* of the cutter 13 in the relieving interference portion I only by the control of the rotation angle of the cutter 13.

Accordingly, a conventionally required mechanism to cause an offset between the cutter 13 and the workpiece 50 in the Y direction in FIG. 10 is no longer required. This simplifies a machine configuration and reduces cost.

Moreover, the method of preventing the relieving interference in the machine tool according to this embodiment can be implemented only by changing a program for the controller 40, which in turn reduces cost.

Further, upon the termination of the machining step, the controller 40 performs control such that the relieving R may be performed in which the cutter 13 is moved away from the workpiece 50, and, together with the relieving R, adjusts the amount by which the cutter 13 is moved away from the workpiece 50 in its rotation direction by the offset control. Thereby, control can be performed such that the target relieving Rt may be set to the target relieving Rt' even if the relieving R is of fixed length.

Further, upon the termination of the machining step, the controller 40 performs control such that the relieving R' may be performed in which the cutter 13 is moved away from the workpiece 50, adjusts the amount of this relieving R', and adjusts the amount by which the cutter 13 is moved away from the workpiece 50 in its rotation direction by the offset control. Thereby, an optimum direction and magnitude of the target relieving Rt" can be achieved.

Therefore, the present invention can provide the method of controlling a machine tool and a machine tool which allow preventing relieving interference without using a mechanism for causing an offset between the cutter 13 and the workpiece 50.

INDUSTRIAL APPLICABILITY

The present invention can be used for a method of controlling a machine tool and a machine tool, particularly for a method of controlling a machine tool configured to machine a workpiece into an internal gear and for a machine tool.

EXPLANATION OF REFERENCE NUMERALS

10 cutter head
11 support
12 main spindle
13 cutter
14 gear
15 crank arm
16 spherical bearing
17 sliding portion
18 pin
19 crankshaft
20 crank faceplate portion
22 ball screw
23, 24 gear
25 camshaft
26 cam
27 cam follower
28 cam lever
29 eccentric shaft
30 relieving rod
31, 32 pin
33 eccentric shaft faceplate portion
35 motor for main spindle reciprocating movement
36 camshaft driving motor
37, 38 gear
40 controller
41 main spindle driving motor
42 gear
50 work

The invention claimed is:

1. A method of controlling a machine tool configured to machine a workpiece to be machined by repeating the steps of: machining the workpiece by moving a cutter for machining the workpiece in a direction parallel to a rotational axis of the cutter while rotating the workpiece together with the cutter; and returning the cutter to a machining start position again after termination of the machining step, the method characterized in that upon the termination of the machining step, offset control is performed such that the cutter is moved away from the workpiece in a rotation direction of the cutter without change in a relative position of the rotational axis of the cutter with respect to the workpiece.

2. The method of controlling a machine tool according to claim 1, characterized in that upon the termination of the machining step, relieving is performed such that the cutter and the workpiece become away from each other by changing relative positions of the rotational axis of the cutter and a rotational axis of the workpiece with respect to each other, and, together with the relieving, the amount by which the cutter is moved away from the workpiece in the rotation direction thereof by the offset control is adjusted, thereby controlling a direction of target relieving.

3. The method of controlling a machine tool according to claim 1, characterized in that upon the termination of the machining step, relieving is performed such that the cutter is moved away from the workpiece, the amount of the relieving is adjusted, and the amount by which the cutter is moved away from the workpiece in the rotation direction thereof by the offset control is adjusted, thereby controlling a direction and magnitude of target relieving.

4. A machine tool comprising:

workpiece rotation means for rotating a workpiece to be machined;

cutter rotation means for rotating a cutter for machining the workpiece;

cutter reciprocation means for moving the cutter in a direction parallel to a rotational axis of the cutter;

relieving means for moving the cutter away from the workpiece; and control means for controlling the workpiece rotation means, the cutter rotation means, the cutter reciprocation means, and the relieving means, the machine tool characterized in that the control means performs control such that the workpiece is machined by repeating the steps of: machining the workpiece by moving the cutter for machining the workpiece in the direction parallel to the rotational axis of the cutter while rotating the workpiece together with the cutter; and returning the cutter to a machining start position again after termination of the machining step, and performs offset control such that the cutter is moved away from the workpiece in a rotation direction of the cutter upon the termination of the machining step.

5. The machine tool according to claim 4, characterized in that the control means performs control such that relieving is performed in which the cutter is moved away from the workpiece upon the termination of the machining step, and adjusts the amount by which the cutter is moved away from the workpiece in the rotation direction thereof by the offset control together with the relieving, thereby controlling a direction of target relieving.

6. The machine tool according to claim 4, characterized in that the control means performs control such that relieving is performed in which the cutter is moved away from the workpiece upon the termination of the machining step, and adjusts the amount of the relieving and the amount by which the cutter is moved away from the workpiece in the rotation direction thereof by the offset control, thereby controlling a direction and magnitude of target relieving.

* * * * *